Aug. 25, 1964   J. O. ENGLE   3,145,946

SPRING DRUM REELING DEVICE

Filed June 5, 1961

INVENTOR.
Joseph O. Engle
BY Townsend and Townsend
attorneys

United States Patent Office 3,145,946
Patented Aug. 25, 1964

3,145,946
SPRING DRUM REELING DEVICE
Joseph O. Engle, 108 Hillcrest Drive, Orinda, Calif.
Filed June 5, 1961, Ser. No. 114,936
4 Claims. (Cl. 242—107)

This invention relates to a rotating drum which is adapted to wind a cord about the drum in order to function as a device for closing doors and the like.

The principal object of this invention is to provide a drum spring urged to provide rotary tension to the drum and with the provision of means for attaching a cord to the center portion of the drum in such a way that the spring tension will cause the cord to wind alternatively to either side of the central cord contact point on the drum as the drum is spring rotated.

One of the features and advantages of this device lies in the fact that the unit can be made in extremely small dimensions and still maintain a considerable amount of stored spring energy thus rendering it adaptable for use as a door closing device particularly in locations where the size of the door closing elements must be restricted.

Another feature and advantage of this device lies in the fact that the cord can be wound to either side of the central contact point of the cord on the drum. This alleviates any problems of installation of the device in that the cord will not tangle or twist under conditions where the cord might be forced in one direction or another. Due to the fact that the cord can be wound to either side of its connected point on the drum there is less chance for the cord to tangle, snag or twist.

Another object of this invention is to provide a novel rotatable drum which can be mounted on the casing of a door and to provide a spring within the interior of the drum which spring biases the drum to return to an original position. A cord is mounted about the central portion of the drum and wrapped around the drum wherein the end of the cord can be attached to a door. When the door is opened the cord rotates the drum against the spring tension contained within the drum therein building up potential energy which will close the door when the opening pressure is released. The device is simple, compact and extremely effective for such purposes as biasing doors to return to the closed position.

The device has the feature and advantage of being useful for other purposes where it would be desirable to be able to pull the cord and have it return under spring tension to its original position.

A further object of this invention is to provide a novel drum for recoiling a cord in which spring tension is provided on the interior of a rotatably mounted drum and a portion of the outer face of the drum is provided with an area of reduced diameter over which a sleeve having an outer diameter equal to the diameter of the remainder of the drum can be mounted. The intersection between the sleeve and the remaining section of the drum forms a convenient mounting device for mounting a cord on the face of the drum.

Other objects of the present invention will become apparent upon reading the following specification and claims and referring to the accompanying drawing in which similar characters of reference represent corresponding parts in each of the several views.

Figure 1:
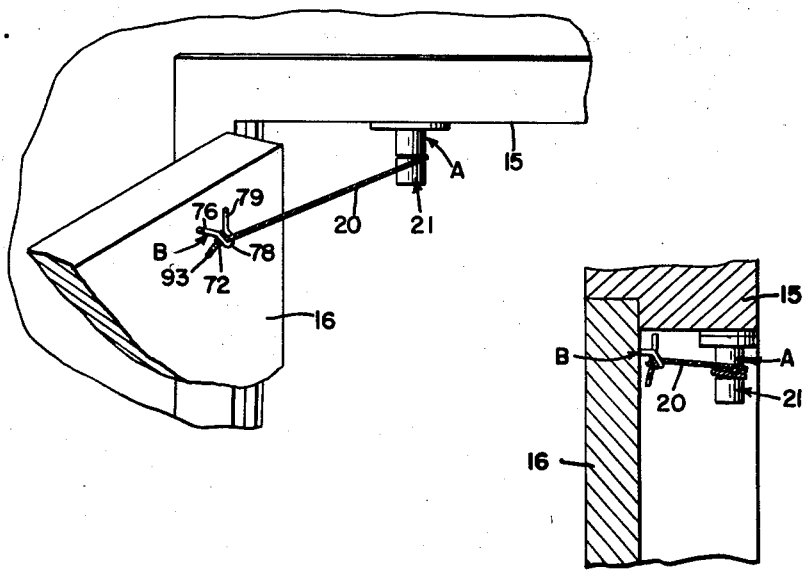
FIG. 1 is a fragmentary view of a door casing having a fragmentary portion of the door shown in a partially opened condition. The door closing device of this invention is shown mounted on the casing with the cord portion of the device connected to the inner face of the door.
Figure 2:
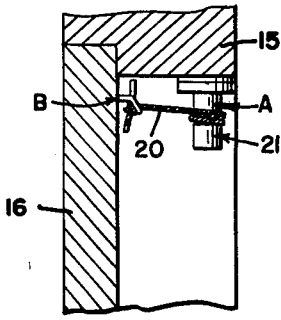
FIG. 2 is a cross-sectional view showing the door in the closed position.
Figure 3:
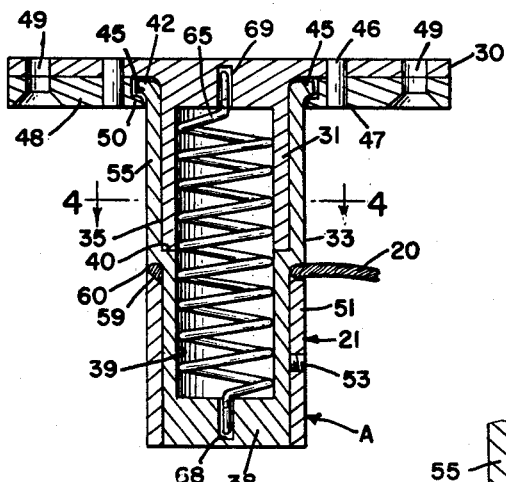
FIG. 3 is an enlarged sectional view of the door closing device of this invention.
Figure 4:
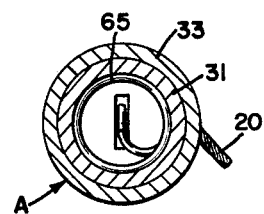
FIG. 4 is a cross-sectional view of FIG. 3 taken at line 4—4.

Referring now to the drawing, as shown particularly in FIGS. 1 and 2, the door closing device indicated generally at A of this invention is mounted on the underface of the top of casing 15 carrying a door 16.

Door closing device A has a cord 20 mounted about a drum 21 of the door closing device. The cord extends to a hook B mounted on the inside face of door 16.

Drum 21 of the door closing device is rotatably mounted on the device and is spring urged in a direction which will cause the rewinding of the cord or string 20 in such a way as to cause door 16 to close.

Door closing device A is formed with a base 30 with a circular flange having a hollow shaft 31 extending outwardly therefrom at the axial center of the base. Shaft 31 is hollow and has a smooth faced cylindrical outer wall.

A cylinder 33 is formed to be rotatably mounted over the cylindrical outer wall of shaft 31. Cylinder 33 accomplishes its rotary mount on shaft 31 by being formed with an area of enlarged diameter at 35 which is slightly larger in diameter than the outer diameter of shaft 31.

Cylinder 33 has its outer end closed by a cap 38 and has the outer end of the bore of the cylinder formed of the same diameter as the inner diameter or bore of shaft 31.

The intersection between the enlarged diameter section 35 and the reduced diameter section 39 of cylinder 33 provides a lip 40 which engages the outer edge of shaft 31 in such a way as to restrict the inner positioning of the cylinder relative to the shaft so that the inner edge 42 of the cylinder can be maintained in slightly spaced relation to base 30 when the cylinder is mounted on the shaft.

Inner edge 42 of cylinder 33 is flanged outwardly to provide an annular flange 45. Cylinder 33 is maintained tightly on the shaft by means of a collar 48 mounted on base 30. The collar is aligned on base 30 by two pins 46 mounted on the base and passing through mating apertures 47 formed in the collar. The entire device A is mounted to a wall surface by means of screws 49. The collar has an inwardly extending flange 50 which overlies flange 45 of cylinder 33 and prevents its removal from shaft 31. The outer wall of the extending portion of cylinder 33 is formed in a cylindrical configuration of a diameter less than the diameter of the inside portion of the wall in order to receive a sleeve 51.

Sleeve 51 has the same diameter as the remaining portion of the wall of the cylinder. Sleeve 51 is mounted against rotation and removable on cylinder 33 by means of a set screw 53.

String or cord 20 is mounted at the intersection between sleeve 51 and the base portion 55 of cylinder 33. The inside edge 59 of sleeve 51 is angularly inclined to wedge the cord in locked position against the annular abutment 60 formed by the outer edge of base portion 55 of the cylinder 33.

A spring 65 is mounted internally within drum 21 and is anchored within a groove 68 in cap portion 38 of cylinder 33 and a groove 69 is formed in the base portion 30.

The free end of string 20 is formed near its outer end with a knot 72. The knot is arranged to be fitted into locking engagement with hook B. A small segment 93 of the cord on the outer end of the knot forms an extension by which the knot can be more easily engaged with or removed from the hook.

Hook B is formed with a screw threaded end 76 which can be screwed into door 16. The extending end of hook B is bent to provide a U-shaped hook 78 with an upwardly extending arm 79 which is long enough to be grasped by the fingers to gain leverage for screwing the hook into the door.

To install the device sleeve 51 is removed by loosening set screw 53. The cord 20 is then rested against abutment 60 at 180° or more.

Sleeve 51 is then inserted onto cylinder 33 and compressed against cord 20 wherein it is tightly locked in position on the central portion of drum 21.

Hook B is then screwed into door 16 with arm 79 extending upwardly. The end of cord 20 is knotted and the knot is inserted in U-shaped portion 78 of the hook. The cord is wrapped around the drum an appropriate number of turns so that the drum is under slight tension when the door is in the closed position and upon opening the door the drum is caused to rotate and thus build up spring tension in spring 65 which tends to rotate the drum in the opposite direction.

It can be seen that the door will then be caused to close by the spring tension of spring 65 which causes the drum to rotate and causes the rewinding of cord 20.

It is noted that the outer face of the drum comprises a portion of cylinder 33 and sleeve 51. However, the outer diameter of both the lower portion of the cylinder and the sleeve are identical with the cord or string 20 connected between the two elements or drum in such a way that the cord can adequately be wound in either direction from center. This eliminates any possibility of tangling and provides a more efficient rewinding action.

Figure 6:
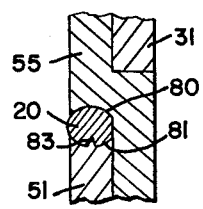
FIG. 6 is a fragmentary enlarged cross-sectional view of a modification of the invention showing means for more securely holding a cord in place on the door closing device.
Figure 5:
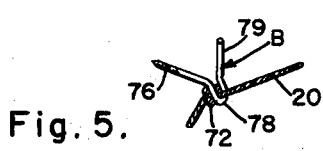
FIG. 5 is an enlarged view showing the hook for mounting the cord of the door closing device to the door.

In FIG. 6 there is shown a modification of the invention wherein both of the mating edges of base portion 55 of cylinder 33 and the mating edge of sleeve 51 are formed to provide two concave faces 80 and 81 the diameter of the faces being substantially equal to the diameter of cord 20. The two faces form a more secure nest arrangement for cord 20. A plurality of projections 83 are formed in the inner face of the concave surface 81 and spaced along the surface at regular intervals. The projections 83 are arranged to tightly lock the cord against slippage.

Although the principal embodiment of the invention has shown the device A mounted on the threshold of the door and the hook B mounted on the door is it believed obvious that the two parts could be interchanged wherein the hook would be mounted near or adjacent the threshold of the door and the device A could be mounted on the door itself.

While this device has been shown primarily in conjunction with a door closing apparatus it is believed that other uses are obvious such as for example the drum could be formed for recoiling electrical wires and for other such purposes without departing from the spirit and scope of the invention. It is intended that the invention be limited only as appears in the appended claims.

What is claimed:

1. A device for coiling a cord on a drum comprising a base having a flange, a shaft extending outwardly from said flange, a cylinder mounted over said shaft for rotary movement thereon, said cylinder having an inside end adjacent said base and a top end remote from said base, said cylinder and said shaft being hollow to provide aligned bores, a spring mounted within the bore of said shaft and cylinder, means connecting the spring to the top of the cylinder and the end of the shaft, a bore adjacent the flange, the inside end of said cylinder being flanged outwardly to form a circular flange, a collar mounted over said base and engaging the circular flange of said cylinder to prevent removal of said cylinder from said shaft, a cord, and means connecting the cord to the outer periphery of said cylinder substantially midway between its top and inside ends.

2. A device for coiling a cord on a drum comprising a base having a flange, a shaft extending outwardly from said flange, a cylinder mounted over said shaft for rotary movement thereon, said cylinder having an inside end adjacent said base and a top end remote from said base, said cylinder and said shaft being hollow to provide aligned bores, a spring mounted within the bores of said shaft and cylinder, means connecting the spring to the top of the cylinder and the end of the shaft bore adjacent the flange, the inside end of said cylinder being flanged outwardly to form a circular flange, a collar mounted over said base and engaging the circular flange of said cylinder to prevent removal of said cylinder from said shaft, said cylinder being formed on the outer end thereof with a portion of a lesser diameter than the inside portion of the cylinder, a sleeve mounted over the lesser diameter portion of said cylinder, said sleeve having an outer diameter equal to the diameter of the inside portion of said cylinder, and a cord mounted between the inner end of said sleeve and the inside portion of said cylinder.

3. A cord coiling device comprising a drum formed by a cylindrical member having an outer end portion formed of reduced diameter relative to the base portion, a sleeve mounted over the reduced portion of said cylindrical member having an outer diameter equal to the base portion of the cylindrical member, a cord, the intersection between the sleeve and the enlarged portion of the cylindrical member forming connecting means to connect the cord means to the drum, said cylindrical member being formed with an internal bore, a shaft means, the bore of said cylinder being rotatably mounted on said shaft means, and a spring means carried within said cylindrical member and engaged with said cylindrical member and said shaft means to spring bias said drum to return to a home position when rotated against the spring tension afforded by said spring means.

4. A device for coiling a cord on a drum comprising a base member adapted to be mounted to a primary surface, a shaft extending outwardly from said base member, a drum rotatably mounted on said shaft, spring means mounted within said drum and engaging said base member to urge said drum to bias the drum to return to original position, said drum being found with the outer end portion having a diameter less than the inner end of the drum, a sleeve mounted over the area of reduced diameter, said sleeve having an outer diameter equal to the outer diameter of the inner end of said drum and a cord connected to the drum at the intersection of said sleeve and the enlarged diameter portion of the drum.

References Cited in the file of this patent

UNITED STATES PATENTS

| 1,436,241 | Davis | Nov. 21, 1922 |
| 2,412,412 | Meili | Dec. 10, 1946 |
| 2,470,283 | Barger | May 17, 1949 |
| 2,817,482 | Ruggiero et al. | Dec. 24, 1957 |

FOREIGN PATENTS

| 8,072 | Great Britain | Apr. 4, 1910 |